United States Patent
Thompson et al.

(10) Patent No.: US 7,691,775 B2
(45) Date of Patent: Apr. 6, 2010

(54) REDUCIBLE OXIDE BASED CATALYSTS

(75) Inventors: Levi T. Thompson, Northville, MI (US); Chang Hwan Kim, Ann Arbor, MI (US); Shyamal K. Bej, Bartlesville, OK (US)

(73) Assignee: The Regents of The University of Michigan, Ann Arbor, MI (US)

( * ) Notice: Subject to any disclaimer, the term of this patent is extended or adjusted under 35 U.S.C. 154(b) by 292 days.

(21) Appl. No.: 11/744,510

(22) Filed: May 4, 2007

(65) Prior Publication Data

US 2007/0298963 A1 Dec. 27, 2007

Related U.S. Application Data

(60) Provisional application No. 60/797,734, filed on May 4, 2006.

(51) Int. Cl.
*B01J 23/10* (2006.01)
*C07C 19/00* (2006.01)
*C01F 7/02* (2006.01)
*B01J 8/00* (2006.01)
*B01J 23/00* (2006.01)

(52) U.S. Cl. .............. 502/304; 502/302; 502/303; 502/325; 570/244; 423/626; 423/247

(58) Field of Classification Search ............. None
See application file for complete search history.

(56) References Cited

U.S. PATENT DOCUMENTS

| | | | |
|---|---|---|---|
| 5,680,292 | A | 10/1997 | Thompson, Jr. et al. |
| 6,297,185 | B1 | 10/2001 | Thompson et al. |
| 6,455,182 | B1 | 9/2002 | Silver |
| 6,555,088 | B1 | 4/2003 | Baumann et al. |
| 6,723,298 | B1 | 4/2004 | Baumann et al. |
| 6,821,494 | B2 | 11/2004 | Zhu et al. |
| 6,897,178 | B1 | 5/2005 | Thompson et al. |
| 2003/0176753 | A1 | 9/2003 | Levin et al. |

FOREIGN PATENT DOCUMENTS

WO  WO 2005/089936  9/2005

OTHER PUBLICATIONS

Preliminary Report on Patentability for S.N. PCT/US2007/068232 dated Nov. 13, 2008 (7 pages).
Kim, C. H., L. T. Thompson, "Deactivation of Au/CeOx Water Gas Shift Catalysts," Journal of Catalysis, 230 (2005), pp. 66-74.
International Search Report for S.N. PCT/US2007/068232 dated Jul. 25, 2008 (10 pages).

*Primary Examiner*—Melvin C Mayes
*Assistant Examiner*—Sarah Van Oudenaren
(74) *Attorney, Agent, or Firm*—Dierker & Associates, P.C.

(57) ABSTRACT

A catalyst is disclosed herein. The catalyst includes a reducible oxide support and at least one noble metal fixed on the reducible oxide support. The noble metal(s) is loaded on the support at a substantially constant temperature and pH.

25 Claims, No Drawings

REDUCIBLE OXIDE BASED CATALYSTS

CROSS REFERENCE TO RELATED APPLICATIONS

This application claims the benefit of U.S. Provisional Patent application Ser. No. 60/797,734 filed on May 4, 2006, incorporated by reference herein in its entirety.

STATEMENT REGARDING FEDERALLY SPONSORED RESEARCH OR DEVELOPMENT

This invention was made in the course of research partially supported by a grant from the Department of Energy (DOE), Grant Number DE-FC04-02AL67630. The U.S. government has certain rights in the invention.

BACKGROUND

The present disclosure relates generally to catalysts, and more particularly to reducible oxide based catalysts and methods of making the same.

The water gas shift is a key reaction in the conversion of hydrocarbons and alcohols (such as methanol, ethanol, natural gas, gasoline, diesel, and the like) into hydrogen-rich gas. The reaction converts carbon monoxide and water into carbon dioxide and hydrogen. The reaction increases the amount of hydrogen formed and removes carbon monoxide, which is a poison for some catalysts, including those used in ammonia synthesis and fuel cells. Generally, the water gas shift reaction is performed by passing a reactant-containing gas stream over a solid catalyst. As such, the rate of conversion of the reactant into hydrogen is dependent, at least in part, on the catalyst used. Further, the size, weight, and cost of systems used to generate hydrogen may also be dependant upon the efficiency of the catalyst used.

Copper and iron-chromium based catalysts are often used for the water gas shift reaction. However, such catalysts may not be suitable for portable and vehicular applications as they may, in some instances, have insufficient durability and activity.

As such, it would be desirable to provide an efficient catalyst for the water gas shift reaction that would be useful for varied applications, including portable and vehicular applications, and that would aid in reducing the size, weight and cost of systems used to generate hydrogen.

SUMMARY

A catalyst is disclosed herein. The catalyst includes a reducible oxide support and at least one noble metal fixed on the reducible oxide support. The noble metal(s) is fixed on the support at a substantially constant temperature and pH.

A method of making the catalyst is also disclosed. The method generally includes making a reducible oxide support and then loading a noble metal thereon. In an embodiment, air is passed at a first flow rate through a metal carbonate or a metal acetate in a reactor. The reactor is heated to a first temperature and then water is introduced into the passing air. The reactor is heated to a second temperature that is higher than the first temperature. Water is removed from the passing air, and the flow rate of the passing air is increased from the first flow rate to a second flow rate that is higher than the first flow rate. The reactor is heated to a third temperature that is higher than the second temperature, and is then ballistically cooled to room temperature, thereby forming a reducible oxide material. The reducible oxide material is ground into a powder and is added to water to form an aqueous suspension. The aqueous suspension is maintained at a temperature ranging from about 50° C. to about 70° C. and at a pH ranging from about 9 to about 11. A predetermined amount of the noble metal (e.g., a noble metal containing solution) is added to the aqueous suspension while substantially maintaining the temperature and the pH, thereby forming a solid material in the suspension. The solid material is separated from the suspension, and is dried under vacuum at a temperature ranging from about 70° C. to about 90° C., thereby forming the reducible oxide supported noble metal catalyst.

DETAILED DESCRIPTION OF THE EMBODIMENTS

Embodiment(s) of the catalyst disclosed herein may advantageously reduce the cost, the size, and the weights of systems for producing hydrogen in which the catalysts are used. Generally, catalysts having increased activity yield substantially smaller, lighter reactors. Further, the catalysts disclosed herein may yield substantially higher reaction rates than commercially available catalysts.

Further, embodiment(s) of the catalyst generally include a reducible oxide support and one or more noble metals fixed on the support. Generally, the catalyst is made by forming the reducible oxide support, and then loading the noble metal(s) on the reducible oxide support. Non-limitative examples of the reducible oxide include cerium oxide (e.g., $CeO_x$, $1.5<x\leq2$), cobalt oxide ($CoO_x$), iron oxide ($FeO_x$), zinc oxide ($ZnO_x$), or the like, or combinations thereof.

To form the reducible oxide support, a predetermined amount of a metal carbonate (e.g., cerium carbonate, cobalt carbonate, or zinc carbonate) or a metal acetate (e.g., cerium acetate, cobalt acetate, zinc acetate, or iron acetate) is loaded into a container or other object suitable to withstand high temperatures (e.g., a reactor). In an embodiment, the amount of metal carbonate or acetate ranges from about 1 gram to about 2 grams. The container or reactor may be loaded into a furnace.

Air is passed at a first flow rate through the metal carbonate or acetate. In an embodiment, the first flow rate is up to about 200 ml/min. In a non-limitative example, the first flow rate is about 21 ml/min. The container or reactor may be heated to a first temperature, which generally ranges from about 80° C. to about 120° C. In a non-limitative example, the first temperature is about 100° C.

After the container or reactor has reached the first temperature, water is introduced into the air passing through the metal carbonate or acetate, at a rate of about 0.05 ml/min (corresponding to a stream flow rate of about 62.5 ml/min). It is to be understood that the water/air flow may be up to about 200 ml/min. As the water/air flow passes through the material, the container or reactor is heated to a second temperature, which is higher than the first temperature. Generally, the second temperature may be up to about 180° C. In a non-limitative example, the second temperature is about 145° C. The container or reactor may remain at the second temperature for a predetermined time (e.g., up to about 4 hours) while the water and air pass through the material.

After the predetermined time has passed, the water is removed from the passing air, and the passing air flow rate is increased from the first flow rate to a second flow rate, which is higher than the first flow rate. In an embodiment, the second flow rate is up to about 200 ml/min. In a non-limitative example, the second flow rate is about 100 ml/min.

The container or reactor is then heated to a third temperature (a non-limitative example of which is about 400° C.) that is higher than the second temperature. It is to be understood that the third temperature may be up to about 700° C. Again, the container or reactor is allowed to remain at this temperature for a predetermined time (e.g., up to about 6 hours). Upon reaching the predetermined time, the container or reactor is ballistically cooled to room temperature, thereby forming the reducible oxide support material. As referred to herein, the term "ballistically cooled" generally means that the container or reactor is opened, and the material therein is allowed to cool naturally upon exposure to ambient conditions.

In embodiments of forming the reducible oxide support, it is to be understood that the third temperature may be up to about 700° C. Furthermore, the first and second temperatures are generally not higher than about 400° C.

In an embodiment, the noble metal may be loaded or fixed on the reducible oxide support material. The reducible oxide material is ground into a powder. The powder is made up of fine particles, each of which has a diameter equal to or less than, or which sieves at less than about 100 microns (i.e., about 150 mesh). In an embodiment, the reducible oxide material may be doped, for example, with zirconium, gadolinium, yttrium, rhenium, or other like materials, or combinations thereof. Without being bound to any theory, it is believed that doping may substantially improve activity maintenance (i.e., less deactivation).

A suspension of the reducible oxide material is formed by adding the powder to water (a non-limitative example of which is de-ionized water). The aqueous suspension is maintained at a temperature ranging from about 50° C. to about 70° C. and at a pH ranging from about 9 to about 11 throughout the process. In another embodiment, the temperature of the aqueous suspension is maintained between about 55° C. and about 60° C., and the pH is about 10. Throughout the process, the pH of the suspension may be maintained by adding a predetermined amount of a sodium carbonate solution to the aqueous suspension.

A predetermined amount of the noble metal (which may be in solution) is added to the aqueous suspension. The amount of noble metal added depends, at least in part, on the available surface area of reducible oxide used, the desired activity of catalyst, and/or the like, and/or combinations thereof. In an embodiment, the amount of noble metal ranges from about 0.02% to about 10%. As a non-limiting example, the predetermined amount of noble metal is about 0.1%. Non-limitative examples of suitable noble metals include gold, platinum, palladium, rhodium, silver, and/or combinations thereof. A solid material is formed in the suspension. In an embodiment, the solid material is aged in the suspension for a predetermined time (e.g., about 1 hour) and at a predetermined temperature (e.g., temperature ranging from about 50° C. to about 70° C.).

The solid material is then separated from the suspension, and may be washed in de-ionized water. The solid material is dried under vacuum at a temperature ranging from about 70° C. to about 90° C., thereby forming the reducible oxide supported noble metal catalyst. In an alternate embodiment, the drying temperature ranges from about 80° C. to about 85° C.

It is to be understood that the process steps described herein may be carried out in the presence of oxygen.

The formed reducible oxide supported noble metal catalyst (a non-limiting example of which includes a cerium supported gold catalyst) may be used in a water gas shift reaction. To carry out the reaction, a gaseous stream containing hydrogen, nitrogen, carbon monoxide, carbon dioxide, and/or water, and/or other desirable constituents is contacted with or passed over the reducible oxide supported noble metal catalyst, such as described above.

To further illustrate embodiment(s) of the present disclosure, the following examples are given. It is to be understood that these examples are provided for illustrative purposes and are not to be construed as limiting the scope of embodiment(s) of the present disclosure.

Example 1

Ceria Support Preparation

About 1.93 grams of cerium (III) carbonate (which is commercially available under the tradename REacton from Alfa Aesar located in Ward Hill, Mass.) was loaded in a 10 mm i.d. quartz U-tube reactor. A thermocouple was placed inside the carbonate powder to measure the temperature. The reactor was then placed in a furnace.

Air, flowing at 21 ml/min, was passed through the cerium carbonate. The reactor was heated to about 100° C. within about 10 minutes of the initial air flow. After the temperature reached about 100° C., water was introduced into the air flow at a rate of about 0.05 ml/min, corresponding to a stream flow rate of about 62.5 ml/min. The reactor temperature was increased to about 145° C. and was maintained for about 3 hours. The water flow was then discontinued and the air flow rate was increased to about 100 ml/min. The reactor temperature was increased to about 400° C., and this temperature was maintained for about 5 hours.

The reactor was then ballistically cooled to room temperature and was removed from the furnace. The formed ceria material was ground to a fine powder.

Fixing Gold on the Ceria Support

About 0.95 grams of the ceria powder was added to about 100 ml of deionized water, to form a suspension. The suspension was stirred with a magnetic stir bar, and the temperature was maintained at about 55° C.

A solution of $HAuCl_4$ was prepared by dissolving about 0.1 grams of $HAuCl_4 \cdot 3H_2O$ (commercially available from Alfa Aesar) in about 50 ml of de-ionized water.

A sodium carbonate solution was prepared by dissolving about 1 gram of $Na_2CO_3$ in about 100 ml of de-ionized water. The sodium carbonate solution was added dropwise to the ceria suspension until the pH reached about 10, and was added periodically throughout the remainder of the process to maintain the pH at about 10.

About 50 ml of the $HAuCl_4$ solution was added dropwise to the suspension while stirring continuously. Additional amounts of the sodium carbonate solution were added to maintain the pH at about 10. After the solid material formed, it was aged for 1 hour in the same solution, then filtered and dried under vacuum at about 85° C. for about 6 hours.

The temperature of the solution was maintained at about 55° C. throughout the process.

Example 2

Ceria Support Preparation

Two cerium oxide supports were synthesized, one using a temperature programmed reaction method and the other using a conventional precipitation method. The conventional precipitation method was used to benchmark the performance of ceria prepared by the temperature programmed reaction method.

Temperature programmed reaction method. About 1.0-2.0 grams of cerium carbonate ($Ce_2(CO_3)_3 \cdot xH_2O$) was loaded onto a quartz-wool plug located inside a quartz reactor (ID=8 mm). The reactor was placed inside a furnace. The temperature of the reactor was measured using a thermocouple (K-type) placed just above the oxide bed, and was controlled using a temperature controller (Omega CN-4321) connected to the furnace.

A mixture of about 75% $H_2O$ (vapor) and balance air was passed through the reactor. The reactor was heated linearly up to about 100° C. in dry air, and was then soaked at the final temperature (about 150° C.) for about 2-3 hours. The materials were then calcined at temperatures ranging from about 400° C. to about 700° C. for about 4 hours.

Conventional precipitation method. A solution containing appropriate amounts of cerium acetate in 100 ml of de-ionized water was prepared and slowly added to another solution containing about 10 grams of $Na_2CO_3$ in 100 ml of de-ionized water. The formed solid was filtered and dried. The dried material was calcined at about 400° C. in air for about 4 hours.

Fixing Gold on the Ceria Supports

The ceria supports (formed via the temperature programmed reaction method and the conventional precipitation method) were each transferred from the respective synthesis reactors to de-ionized water. The respective ceria supports were suspended in about 100 ml of de-ionized water by vigorous stirring. The temperature of the respective suspensions was maintained between about 55° C. and about 60° C. A solution containing about 1.5 g of $Na_2CO_3$ in about 150 ml of de-ionized water was prepared and added to the ceria suspensions until the pH increased to approximately 10.0.

Appropriate amounts of the suitable metal compound ($HAuCl_4 \cdot 3H_2O$) were dissolved in 30-60 ml of de-ionized water, and then were slowly added to the respective ceria suspensions. During this period, the pH of each suspension was maintained at about 10.0 by adding more of the $Na_2CO_3$ solution. After addition of the Au solution, the temperature of each suspension was maintained at 60° C., and the material was aged for 1 hr.

Each suspension results in the formation of solids. The formed solids were then filtered through a respective filtering funnel (pore size=0.45 μm). The respective solids were washed twice using 1000 ml of the de-ionized water each time. The respective filtered solids were then transferred to 1000 ml of the de-ionized water. These solutions were stirred vigorously for about 1 hour. The respective solids were allowed to settle for a couple of hours, and the water was separated by decantation. The washing procedure was repeated two times. After washing, an appropriated amount of the wet materials were transferred to a vacuum oven whose temperature was maintained 80° C. The materials were dried in the oven for about 6-8 hours.

Cu—Zn—Al (commercially available from Sud-Chemie, located in Louisville, Ky.) and ceria (commercially available from Rhodia, located in Cranbury, N.J.) catalysts were used to benchmark the water gas shift rates for the Au/CeO$_x$ catalysts.

Water Gas Shift Rates

The reactant contained 43% $H_2$ (99.99%), 19% $N_2$ (99.995%), 10% CO (99.5%), 6% $CO_2$ (99.8%), and 22% de-ionized $H_2O$ (18.2 MΩ·cm at 25° C.). This feed gas simulates exhaust products from the partial oxidation of gasoline. Carbonyls were removed from the CO stream during passage through a bed of alumina (Sud-Chemie CS-232). The gases were delivered using mass flow controllers, and $H_2O$ was added by vaporizing liquid from a HPLC pump. The vaporizing cylinder had a 150 ml inner volume, and its temperature was maintained at about 275° C. Other gases were mixed with $H_2O$ vapor in the same vessel. The gas lines were heated to about 120° C. between the saturator and the catalyst bed to prevent condensation.

The catalyst (about 20-50 mg) was loaded onto a quartz wool plug that was packed in a 4 mm ID quartz tube. The catalyst was diluted with $SiO_2$ (99.995%, <1 m$^2$/g, −60+120 mesh, commercially available from Alfa Aesar) to attain a predetermined bed volume. The reactor tube was heated using a furnace with PID temperature control. A K-type thermocouple (1/16 inch diameter Alloy 600 sheath) contacted the top of the catalyst bed. The Au/CeO$_x$ catalysts were pretreated in about 4% $H_2$ in $N_2$ at about 200° C. The ceria catalyst was reduced at about 400° C. for about 4 hours using the same gas mixture.

The Cu—Zn—Al catalyst was pretreated at about 200° C. in a mixture of about 4% $H_2$ in $N_2$ for about 4 hours (as recommended by the manufacturer). The rates were measured at temperatures up to about 240° C. and at atmospheric pressure. An SRI Model 8610C gas chromatograph equipped with a Carboxen 1000 column and a thermal conductivity detector was used to determine the effluent composition. A condenser was placed upstream of the gas chromatograph to reduce the dew point to about 0° C. The blank silica (0.125 cm$^3$) was not active for water gas shift.

The reaction rates approached steady-state after approximately 3 hours on-stream and were reproducible to within about 10% during subsequent runs. There was no evidence of methane formation for the catalysts under the conditions employed. The CO conversion ranged from about 2% to about 30%. The results are summarized in the following tables.

TABLE 1

Effects of Precursor and Preparation Method for Ceria Support

| | Catalyst | |
| --- | --- | --- |
| | 5% Au/CeO$_x$ | 5% Au/CeO$_x$ |
| Surface Area (m$^2$/g) | 142 | 193 |
| Precursor | Cerium Acetate | Cerium Carbonate |
| Preparation Method for Ceria | Precipitation | Temperature Programmed Reaction |
| Calcination Temperature | 400° C. | 400° C. |
| Reaction Rate (μmol/s/g) at: | | |
| 240° C.[‡] | 47.5 | 293.4 |
| 240° C.[*] | 12.2 | 109.4 |
| 230° C. | 11.6 | 105.3 |
| 210° C. | 7.7 | 59.5 |
| 200° C. | 6.6 | 59.0 |
| Apparent Activation Energy (kcal/mol) | 7.9 | 8.7 |

[‡]Initial rate

[*]Steady-state rate

TABLE 2

Effects of Support Calcination Temperature on WGS Rates and Apparent Activation Energies for Ceria Support Prepared Using the Temperature Programmed Reaction Method

| | Catalyst | | | | |
|---|---|---|---|---|---|
| | 5% Au/CeO$_x$ | 5% Au/CeO$_x$ | 5% Au/CeO$_x$ | 5% Au/CeO$_x$ | 5% Au/CeO$_x$ |
| Surface Area (m$^2$/g) | 193 | 148 | 105 | 45 | 15 |
| Calcination Temperature | 400° C. | 500° C. | 600° C. | 700° C. | 800° C. |
| Reaction Rate (μmol/s/g) at: | | | | | |
| 240° C.‡ | 293.4 | 225.1 | 158.6 | 62.4 | 5.0 |
| 240° C.* | 109.4 | 93.7 | 80.9 | 32.2 | 3.8 |
| 230° C. | 105.3 | 85.6 | 76.2 | 29.6 | 2.8 |
| 210° C. | 59.5 | 45.5 | 45.2 | 16.2 | 1.6 |
| 200° C. | 59.0 | 44.1 | 42.7 | 14.5 | 1.1 |
| Apparent Activation Energy (kcal/mol) | 8.7 | 10.3 | 8.7 | 10.6 | 14.6 |

‡Initial rate
*Steady-state rate

TABLE 3

Effects of Metal Loading on WGS Rates and Apparent Activation Energies

| | Catalyst | | | |
|---|---|---|---|---|
| | Commercial CeO$_x$ | 2% Au/CeO$_x$ | 5% Au/CeO$_x$ | 10% Au/CeO$_x$ |
| Surface Area (m$^2$/g) | 203 | 195 | 193 | 196 |
| Calcination Temperature | 400° C. | 400° C. | 400° C. | 400° C. |
| Reaction Rate (μmol/s/g) At: | | | | |
| 240° C.‡ | 0.0 | 70.2 | 293.4 | 325.1 |
| 240° C.* | 0.0 | 25.8 | 109.4 | 126.7 |
| 230° C. | 0.0 | 23.5 | 105.3 | 120.3 |
| 210° C. | 0.0 | 11.9 | 59.5 | 71.2 |
| 200° C. | 0.0 | 8.4 | 59.0 | 65.6 |
| Apparent Activation Energy (kcal/mol) | — | 14.1 | 8.7 | 8.9 |

‡Initial rate
*Steady-state rate

TABLE 4

Water Gas Shift Rates and Apparent Activation Energies for Commercial Catalysts

| | Catalyst Commercial Cu—Zn—Al |
|---|---|
| Surface Area (m$^2$/g) | 60 |
| Pretreatment | 4% H$_2$, 96% N$_2$ 200° C. |
| Reaction Rate (μmol/s/g) at: | |
| 240° C. | 59.5 |
| 230° C. | 55.1 |
| 210° C. | 30.3 |
| 200° C. | 24.0 |
| Apparent Activation Energy (kcal/mol) | 11.9 |

As indicated by the results, the 5% Au/CeO$_x$ catalyst (surface area of 193 m$^2$/g) was much more active than its ceria support (surface area of 203 m$^2$/g). Further, the 5% Au/CeO$_x$ catalyst possessed a higher reaction rate than the 2% Au/CeO$_x$ catalyst. Still further, the 5% Au/CeO$_x$ (surface area of 193 m$^2$/g) catalyst yielded reaction rates that are significantly higher than those for a commercial Cu—Zn—Al catalyst.

While several embodiments have been described in detail, it will be apparent to those skilled in the art that the disclosed embodiments may be modified. Therefore, the foregoing description is to be considered exemplary rather than limiting.

What is claimed is:

1. A method of making a reducible oxide supported noble metal catalyst, the method comprising:
    forming a reducible oxide support by:
        passing air at a first flow rate through a metal carbonate or a metal acetate;
        heating the metal carbonate or the metal acetate to a first temperature;
        introducing water into the passing air;
        increasing the first temperature to a second temperature higher than the first temperature;
        removing the water from the passing air;
        increasing the first flow rate to a second flow rate higher than the first flow rate;
        increasing the second temperature to a third temperature higher than the second temperature; and
        ballistically cooling from the third temperature to room temperature, thereby forming the reducible oxide material; and
    loading a noble metal on the reducible oxide support.

2. The method as defined in claim 1 wherein forming and loading are each carried out in the presence of oxygen.

3. The method as defined in claim 1 wherein the metal carbonate is selected from cerium carbonate, cobalt carbonate, zinc carbonate, and combinations thereof; or wherein the metal acetate is selected from cerium acetate, cobalt acetate, zinc acetate, iron acetate, and combinations thereof.

4. The method as defined in claim 1 wherein the first and second temperatures are each equal to or less than 400° C., and wherein the third temperature is equal to or less than 700° C.

5. The method as defined in claim 1 wherein loading the noble metal on the reducible oxide support is accomplished by:
grinding the reducible oxide support into a powder;
forming an aqueous suspension of the reducible oxide by adding the powder to water;
maintaining the aqueous suspension at a predetermined temperature and a predetermined pH;
adding a predetermined amount of the noble metal to the aqueous suspension while substantially maintaining the predetermined temperature and the predetermined pH, thereby forming a solid material in the suspension;
separating the solid material from the suspension; and
drying the solid material under vacuum at a second predetermined temperature.

6. The method as defined in claim 1 wherein the predetermined temperature ranges from about 50° C. to about 70° C., and wherein the predetermined pH ranges from about 9 to about 11.

7. The method as defined in claim 5 wherein each powder particle has a diameter equal to or less than about 100 microns.

8. The method as defined in claim 5 wherein the second predetermined temperature ranges from about 70° C. to about 90° C.

9. A method of making a reducible oxide supported noble metal catalyst, the method comprising:
in a reactor, passing air at a first flow rate through a metal carbonate or a metal acetate;
heating the reactor to a first temperature;
introducing water into the passing air;
heating the reactor to a second temperature, the second temperature higher than the first temperature;
removing the water from the passing air;
increasing the first flow rate to a second flow rate higher than the first flow rate;
heating the reactor to a third temperature, the third temperature higher than the second temperature;
ballistically cooling the reactor to room temperature, thereby forming a reducible oxide material;
grinding the reducible oxide material into a powder, each powder particle having a diameter less than about 100 microns;
forming an aqueous suspension of the reducible oxide by adding the powder to water;
maintaining the aqueous suspension at a temperature ranging from about 50° C. to about 70° C. and at a pH ranging from about 9 to about 11;
adding a predetermined amount of the noble metal to the aqueous suspension while substantially maintaining the temperature and the pH, thereby forming a solid material in the suspension;
separating the solid material from the suspension; and
drying the solid material under vacuum at a temperature ranging from about 70° C. to about 90° C., thereby forming the reducible oxide supported noble metal catalyst.

10. The method as defined in claim 9 wherein the noble metal is selected from gold, platinum, palladium, rhodium, silver, and combinations thereof.

11. The method as defined in claim 9 wherein each of the method steps is carried out in the presence of oxygen.

12. The method as defined in claim 9 wherein the water in the reducible oxide suspension is de-ionized water.

13. The method as defined in claim 9 wherein the reducible oxide is selected from cerium oxide, cobalt oxide, iron oxide, titanium oxide, zinc oxide, and combinations thereof.

14. The method as defined in claim 9 wherein the pH is maintained by adding a predetermined amount of a sodium carbonate solution to the aqueous suspension.

15. The method as defined in claim 9 wherein prior to drying the solid material, the method further comprises washing the solid material with de-ionized water.

16. The method as defined in claim 9 wherein the metal carbonate is selected from cerium carbonate, cobalt carbonate, zinc carbonate, and combinations thereof; or wherein the metal acetate is selected from cerium acetate, cobalt acetate, zinc acetate, iron acetate, and combinations thereof.

17. The method as defined in claim 9 wherein prior to separating the solid material from the suspension, the method further comprises aging the solid material in the suspension at a temperature ranging from about 50° C. to about 70° C. for about 1 hour.

18. A method of making a ceria supported noble metal catalyst, the method comprising:
in a reactor, passing air at a first flow rate through cerium carbonate or cerium acetate;
heating the reactor to a first temperature;
introducing water into the passing air;
heating the reactor to a second temperature, the second temperature higher than the first temperature;
removing the water from the passing air;
increasing the first flow rate to a second flow rate higher than the first flow rate;
heating the reactor to a third temperature, the third temperature higher than the second temperature;
ballistically cooling the reactor to room temperature, thereby forming a ceria material;
grinding the ceria material into a powder;
forming an aqueous suspension of the ceria by adding the powder to water;
maintaining the aqueous suspension at a temperature ranging from about 50° C. to about 70° C. and at a pH ranging from about 9 to about 11;
adding a predetermined amount of the noble metal to the aqueous ceria suspension while substantially maintaining the temperature and the pH, thereby forming a solid material in the suspension;
separating the solid material from the suspension; and
drying the solid material under vacuum at a temperature ranging from about 70° C. to about 90° C., thereby forming the ceria noble metal catalyst.

19. The method as defined in claim 18 wherein the noble metal is selected from gold, platinum, palladium, rhodium, silver, and combinations thereof.

20. The method as defined in claim 18 wherein each of the method steps is carried out in the presence of oxygen.

21. The method as defined in claim 18 wherein the water in the aqueous ceria suspension is de-ionized water.

22. The method as defined in claim 18 wherein the ceria powder includes a plurality of particles, each of which sieves to less than about 100 microns.

23. The method as defined in claim 18 wherein the pH is maintained by adding a predetermined amount of a sodium carbonate solution to the aqueous suspension.

24. The method as defined in claim 18 wherein prior to drying the solid material, the method further comprises washing the solid material with de-ionized water.

25. The method as defined in claim 18 wherein prior to separating the solid material from the suspension, the method further comprises aging the solid material in the suspension at a temperature ranging between about 50° C. and about 70° C. for about 1 hour.

* * * * *